No. 668,304. Patented Feb. 19, 1901.
W. B. CARNAY.
SHIPPING REFRIGERATOR.
(Application filed Oct. 24, 1900.)
(No Model.)
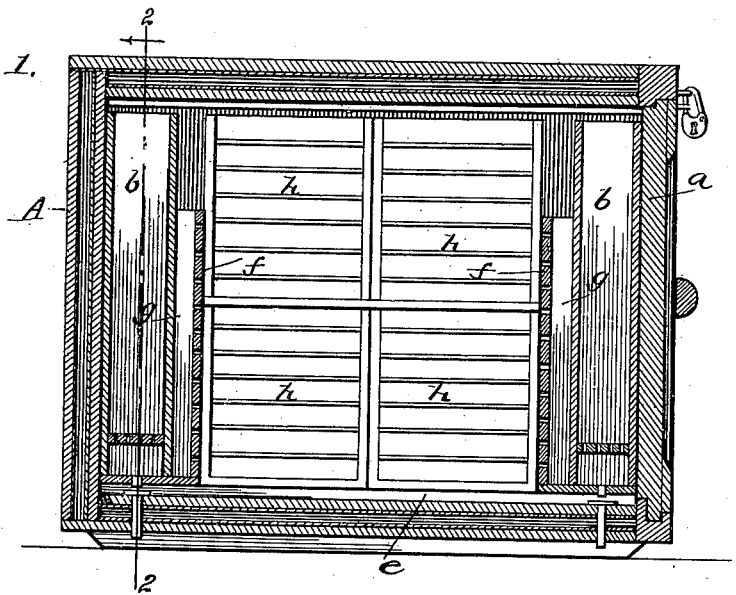
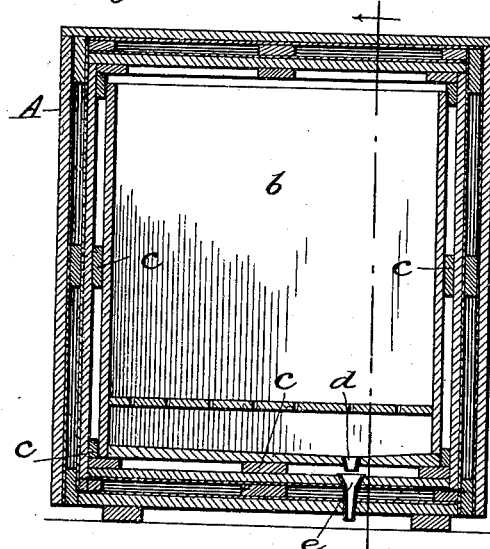
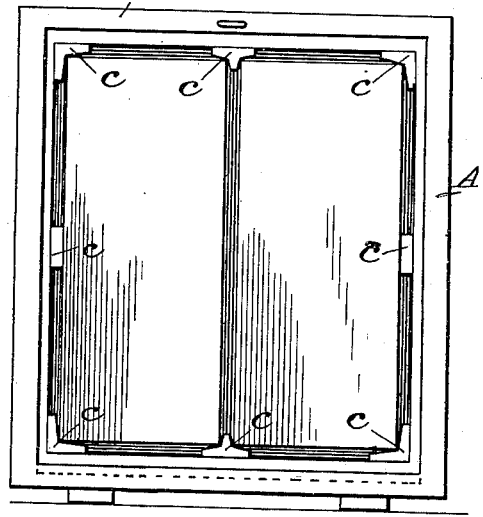
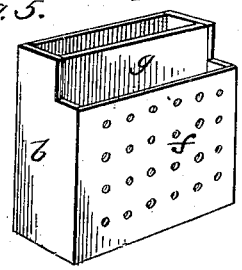
WITNESSES:
R. W. Bishop.
R. P. Herrick.
INVENTOR,
William B. Carnay
BY Davis & Davis
ATTORNEYS.

UNITED STATES PATENT OFFICE.

WILLIAM B. CARNAY, OF BALLSTON SPA, NEW YORK.

SHIPPING-REFRIGERATOR.

SPECIFICATION forming part of Letters Patent No. 668,304, dated February 19, 1901.

Application filed October 24, 1900. Serial No. 34,204. (No model.)

*To all whom it may concern:*

Be it known that I, WILLIAM B. CARNAY, a citizen of the United States, residing at Ballston Spa, in the county of Saratoga and State of New York, have invented certain new and useful Improvements in Shipping-Refrigerators, of which the following is a full, clear, and exact description, reference being had therein to the accompanying drawings, in which—

Figure 1 is a vertical longitudinal section of the shipping-case, taken on the line 1 1 of Fig. 2; Fig. 2, a vertical transverse section on the line 2 2 of Fig. 1; Fig. 3, an end elevation with the door and one of the ice-chambers removed and showing closed banana-boxes instead of berry-crates shown in Fig. 1; Fig. 4, a detail perspective of one of these closed boxes, and Fig. 5 a perspective view of one ice-chamber removed.

The object of this invention is to provide a shipping-refrigerator which will enable berries and other fruits injured by high temperatures to be transported without deterioration, as more fully hereinafter set forth.

Referring to the drawings by letters, A designates the main case of the refrigerator, which is preferably of approximately rectangular shape and whose walls are made double in the usual manner with refrigerators. At one end the case is provided with a removable door *a*, which is adapted to be secured in place by a suitable lock. At each end of the case or box—that is, at the inner or rear end and at the door end—is placed an ice-box *b*, which is adapted to be slid into place through the open end of the box and be supported upon suitable longitudinal wooden strips *c*, secured longitudinally to the top and bottom and sides of the interior of the box. Attached to the bottom of each ice-chamber is a short tube *d*, which is adapted to carry off the water resulting from the melting of the ice, and each of these tubes *d* empties into a tube *e*, leading out through the bottom of the main box or case. Attached to the inner wall of each ice-chamber is a supplemental wall *f*, which is set away from the wall *a* a short distance to provide an air chamber or space *g*.

Between the removable ice-chambers the berry-supporting crates *h* are placed in any suitable manner, the supplemental walls *f* preventing the crates coming in direct contact with the adjacent walls of the ice-chambers, and thereby spoiling the berries carried by the crates. It will be observed that with this arrangement of removable ice-chambers the berries or other fruit perishable under high temperature will be kept in prime condition during journeys of considerable length. It will be observed also that the refrigerator may be easily handled during transportation, as there are no parts to become disarranged by rough handling, and, further, that the ice-chambers may be readily removed for refilling and for cleaning. It will also be observed that by arranging the ice-chambers at either end of the main box an equable temperature will be maintained. It will be further observed that this refrigerator is designed to carry berries in the regular-sized crates, which may be placed bodily into the refrigerator, whereas in other berry-refrigerators the berries have to be removed from the trays.

It is obvious that instead of employing the shipping-case for the purpose of transporting berries and the like in hot weather it may be employed for transporting bananas and like fruit in cold weather where it is desirable that the fruit shall be protected against low temperature. In this latter use of the shipping-case I prefer that the bananas shall be incased in suitable boxes adapted to be slid into the case from the open end, as shown in Figs. 3 and 4.

It will be observed that it is essential that the door of the refrigerator be located at one end of the case, so that in packing the refrigerator for a shipment the filled ice-chamber at the far or closed end thereof may first be slid into place, then the provision-chamber be properly filled, and then the outer ice-chamber slid into place against the berry-crates, after which the door is closed and locked. In this way the refrigerator may be conveniently and quickly packed for a shipment and in such manner that the intermediate crates of berries will be thoroughly protected. It is further essential that the two ice-chambers shall substantially fill the interior of the case, so that they cannot upset or be jarred about and injure the berry-crates. It is further essential that each ice-chamber shall be provided with a drainage-tube which shall register with and empty into an outlet-tube in the bottom of the case.

Having thus fully described my invention, what I claim, and desire to secure by Letters Patent, is—

A refrigerator shipping apparatus, consisting of a casing constructed of non-conducting walls having a door at one end, two independently-removable ice-chambers inclosed in said casing and being open at their upper ends and being located one at the inner, closed end and the other adjacent to the door, said ice-chambers substantially fitting the interior of the casing and each having a drainage-tube, outlet-tubes in the bottom of the casing registering with said drainage-tubes and removable fruit-carrying means inclosed between the two ice-chambers, substantially as and for the purposes set forth.

In testimony whereof I hereunto affix my signature, in the presence of two witnesses, this 19th day of October, 1900.

WILLIAM B. CARNAY.

Witnesses:
CHARLES SCHWARZ,
LIZZIE SWEENY.